E. S. LEAYCRAFT.
Pipe-Wrench.
No. 218,285.  Patented Aug. 5, 1879.
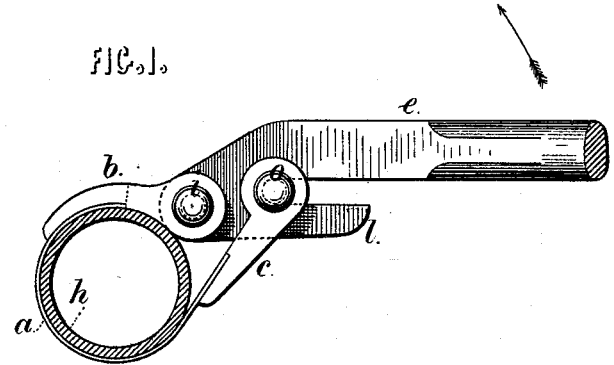
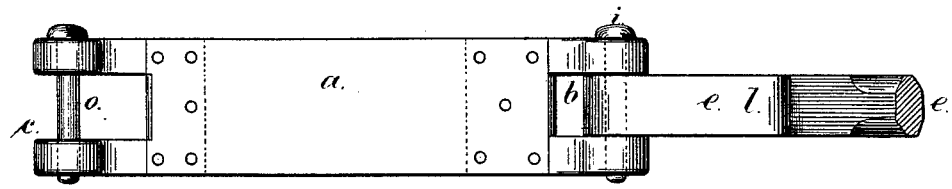
WITNESSES.  
Chas H Smith  
Geo D Pinckney
INVENTOR.  
Edwin S Leaycraft  
per Lemuel W Serrell  
atty.

UNITED STATES PATENT OFFICE.

EDWIN S. LEAYCRAFT, OF BROOKLYN, NEW YORK.

IMPROVEMENT IN PIPE-WRENCHES.

Specification forming part of Letters Patent No. 218,285, dated August 5, 1879; application filed January 18, 1879.

*To all whom it may concern:*

Be it known that I, EDWIN S. LEAYCRAFT, of Brooklyn, in the county of Kings and State of New York, have invented an Improvement in Pipe-Wrenches, of which the following is a specification.

Frictional pipe-wrenches have been made in which a two-part clamp passing around the tube is caused to grasp the pipe by the action thereon of the lever, which also revolves the pipe. Chain-wrenches have also been made use of; but there is a risk of the same slipping apart when the leverage is applied, and if the friction-surface does not conform to the exact shape of the tube the pressure on the tube is unequal, and there is risk of the wrench slipping upon the pipe or bending such pipe out of shape.

My invention relates to a wrench that is especially adapted to thin sheet-metal tubes of brass, copper, &c., but which may be applied to other tubes.

The said improvement consists in the combination, with the actuating-lever, of a complete friction-strap of sheet metal, such as steel, with two end connections—one a joint to the lever, and the other a clevis to connect with a hook on the lever.

By this construction the friction-strap is tightened around the pipe by the action of the lever. It is firmly connected to such lever while in use, and there is no possibility of the parts separating under strain, except in case of fracture, and the friction-strap is easily connected to or disconnected from the lever as the strap is passed around the pipe, and the same lever can be used with different lengths of straps.

In the drawings, Figure 1 is a side view of the lever and friction-strap as applied to the pipe, and Fig. 2 represents the friction-strap as laid out flat.

The friction-strap $a$ is of suitable length for the pipe to be grasped, and at its ends are the forked or clevis connections $b$ and $c$.

The lever $e$ is formed with a hole at one end for the pin $i$, and a hook, $l$, at the side for the pin $o$.

The clevis-connections $b$ $c$ are either made of separate pieces of metal, as shown, or by slitting the ends of the spring or band of a width to admit the lever $e$, and bending back the ends around the respective pins $o$ and $i$, and riveting the said band ends to the body of the band.

When the band is connected to the lever $e$ by the insertion of the pin $i$ it is to be placed around the pipe $h$, and the pin $o$ hooked over the hook $l$, and the lever swung around into the position shown in Fig. 1, and the band $a$ will then grasp the pipe with great firmness in a manner similar to a friction-brake on a hoisting apparatus, and the pipe will be moved by the lever when swung in the direction of the arrow.

By having movable pins $i$ $o$ the friction-strap can be disconnected from the lever, so as to allow one of a different length to be applied. Under any circumstances the pipe is uniformly grasped, and the grasp is slackened and the wrench moved back by the reverse motion to the lever.

I claim as my invention—

The pipe-wrench lever $e$ and friction-strap $a$, hinged or pivoted together at their ends by the pin $i$, in combination with the clevis and pin $o$, and hook $l$ upon the side of the lever, substantially as specified.

Signed by me this 15th day of January, A. D. 1879.

EDWIN S. LEAYCRAFT.

Witnesses:
 GEO. T. PINCKNEY,
 WILLIAM G. MOTT.